United States Patent
Fujii et al.

(10) Patent No.: US 6,598,894 B1
(45) Date of Patent: Jul. 29, 2003

(54) APPARATUS FOR MOUNTING A SIGNAL ELEMENT TO A BICYCLE WHEEL

(75) Inventors: Kazuhiro Fujii, Kawachinagano (JP); Kouji Uno, Osaka (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/516,654

(22) Filed: Mar. 1, 2000

Related U.S. Application Data (63) Continuation-in-part of application No. 09/502,957, filed on Feb. 11, 2000, now abandoned.

(51) Int. Cl.⁷ .................................................. B62J 6/20
(52) U.S. Cl. .................. 280/288.4; 116/28 R; 116/284; 359/523; 340/432
(58) Field of Search .............. 280/288.4; 116/28 R, 116/56, 62.4, 284; 359/523; 340/432

(56) References Cited

U.S. PATENT DOCUMENTS

| | | | | |
|---|---|---|---|---|
| 2,811,633 A | * | 10/1957 | Bjork | 362/72 |
| 3,781,082 A | * | 12/1973 | Linder | 359/523 |
| 3,854,777 A | | 12/1974 | Kennedy | 301/37.41 |
| 3,967,879 A | * | 7/1976 | Tsuyama | 359/523 |
| 4,176,390 A | * | 11/1979 | Galbert | 362/72 |
| 4,430,800 A | | 2/1984 | Shimano | 33/772 |
| 4,847,735 A | * | 7/1989 | Kawasaki | 362/72 |
| 5,278,733 A | * | 1/1994 | St. Thomas | 280/209 |
| 5,456,478 A | * | 10/1995 | Hsu et al. | 280/11.203 |
| 5,487,442 A | * | 1/1996 | Hua | 280/288.4 |
| 5,552,972 A | * | 9/1996 | Rezvani | 280/11.203 |
| 5,800,039 A | * | 9/1998 | Lee | 362/72 |
| 5,984,487 A | * | 11/1999 | McGhee | 362/72 |

FOREIGN PATENT DOCUMENTS

JP      6-42208      11/1994

* cited by examiner

Primary Examiner—Lesley D. Morris
Assistant Examiner—Matthew Luby
(74) Attorney, Agent, or Firm—James A. Deland (57) ABSTRACT

An apparatus for mounting a signal element to a bicycle wheel includes a base member for mounting to the wheel and a movable member coupled to the base member for movement relative to the base member, wherein the movable member includes a signal element mounting location.

60 Claims, 11 Drawing Sheets

APPARATUS FOR MOUNTING A SIGNAL ELEMENT TO A BICYCLE WHEEL

CROSS REFERENCE TO RELATED APPLICATION

This application is a continuation-in-part of Application No. 09/502,957, now abandoned filed Feb. 11, 2000, entitled Apparatus for Mounting a Signal Element to a Bicycle Wheel.

BACKGROUND OF THE INVENTION

The present invention is directed to control devices for bicycle transmissions and, more particularly, to an apparatus for mounting a signal element to a bicycle wheel, wherein the signal element is used to select a processing mode for a computer controlled bicycle transmission.

Computers are sometimes used to control bicycle transmissions. A typical computer controlled bicycle transmission has a processor that receives wheel speed and/or pedal crank speed signals and shifts the bicycle transmission based on these input signals to maintain the wheel and/or pedal crank speed at a desired value. Sometimes it is desirable to shift the bicycle transmission at different speeds depending on the type of terrain over which the bicycle is ridden. To accomplish this, the computer is designed to allow the rider to select different algorithms or speed tables (processing modes) to process the input data based on the expected riding conditions.

One way the rider may select the different processing modes for the computer is by pressing a button or moving a switch on the computer control console. Another method used to select the processing modes is disclosed in U.S. patent application Ser. No. 09/471,668, filed Dec. 24, 1999 and entitled Method and Apparatus for Selecting a Processing Mode for a Bicycle Computer. In the specific embodiment disclosed in that patent application, a plurality of magnetic sensors are mounted to the bicycle frame in close proximity to the rear wheel of the bicycle. One or more magnets are mounted to the spokes of the wheel such that, when the wheel revolves, the one or more magnets activate one or more of the magnetic sensors, and the processing mode of the computer is selected based on which sensors are activated. The processing mode then may be changed by moving the one or more magnets to a different position on the spoke.

While the use of magnets to change the processing mode of the computer eliminates the need for buttons or switches on the computer control console, the user must manually loosen the magnet assembly from the spoke, move the magnet assembly to a different position on the spoke, and then tighten the magnet assembly at the new position. Not only does this require substantial effort, but inexperienced users may have difficulty placing the magnet in the proper position. Thus, it is desirable to have a structure that eliminates much of the effort and guess work when changing the magnet position.

SUMMARY OF THE INVENTION

The present invention is directed to an apparatus for mounting a signal element to a bicycle wheel such that the signal element may be reliably moved to a different position with less effort than known methods. In one embodiment of the present invention, an apparatus for mounting a signal element to a bicycle wheel includes a base member for mounting to the wheel and a movable member coupled to the base member for movement relative to the base member, wherein the movable member includes a signal element mounting location. If desired, a positioning mechanism may be provided for positioning the movable member relative to the base member, wherein the positioning mechanism sets the movable member in one of a plurality of predetermined positions relative to the base member.

In a more specific embodiment, a plate-shaped retainer may be provided for coupling the movable member to the base member, wherein the movable member is disposed between the retainer and the base member and rotates relative to the base member. In this case the signal element mounting location is offset from a rotational axis of the movable member. The positioning mechanism may include a positioning groove disposed on one of the base member and the movable member and a positioning projection disposed on the other one of the base member and the movable member for engaging the positioning groove. If desired, the movable member may include a grasping projection to facilitate rotation of the movable member.

In another embodiment, the base member includes a mounting opening, and the movable member extends through the mounting opening. In this embodiment, the movable member may be rotatably disposed in the mounting opening. As with the previous embodiment, the positioning mechanism may include a positioning groove disposed on one of the base member and the movable member and a positioning projection disposed on the other one of the base member and the movable member for engaging the positioning groove. Also, the movable member may include a grasping projection to facilitate rotation of the movable member. If the movable member is an annular member, then the grasping projection can extend radially inwardly from an inner peripheral surface of the annular member.

In either of the above embodiments a reflector may be mounted on one or both sides of the base member or the mounting member. As a result, the apparatus can be mounted to the wheel spokes and also serve as a safety reflector when the bicycle is ridden at night.

In another embodiment of the present invention, the moving member may comprise a mounting arm pivotably coupled to the base member through a pivot shaft, wherein the signal element mounting location is radially spaced apart from the pivot shaft. If the mounting arm is capable of pivoting by at least 180°, then a first latch can extend from a first side of the mounting arm and a second latch can extend from an opposite second side of the mounting arm. Thus, when the base member is mounted to a wheel spoke, the mounting arm can be placed in one predetermined location by latching the first latch to the spoke. Thereafter, the mounting arm can be rotated 180° and latched to the spoke with the second latch.

In another embodiment of the present invention, the base member includes a movable member mounting boss and a spoke mounting protuberance coupled to the movable member mounting boss. If desired, the spoke mounting protuberance may extend from a side wall of the movable member mounting boss, wherein the spoke mounting protuberance includes a protuberance slot for receiving a spoke therein. In a more specific embodiment, the movable member mounting boss includes a tubular member having a side wall defining a side wall opening extending through the side wall and communicating with the protuberance slot. If the movable member is adapted to be fitted within the tubular member, then the movable member may includes a plurality of positioning grooves on an outer peripheral surface thereof.

Thus, when the apparatus is mounted to a spoke, the spoke may extend into the side wall opening and function as a positioning member for positioning the movable member relative to the base member.

If desired, the spoke mounting protuberance may include a threaded inner peripheral surface, and a mounting screw may engage the threaded inner peripheral surface for mounting the apparatus to the spoke. A support ring may be provided to surround the spoke mounting protrusion and prevent the spoke mounting protrusion from spreading when the mounting screw is engaged with the spoke mounting protrusion. Alternatively, a spoke pressing member may be provided, wherein the spoke pressing member is adapted to be fitted within the protuberance slot. In this case, the spoke mounting protuberance may include a threaded outer peripheral surface, and a nut may be provided for causing the spoke pressing member to move toward the side wall opening and press against the spoke.

DETAILED DESCRIPTION OF THE EMBODIMENTS

Figure 1:
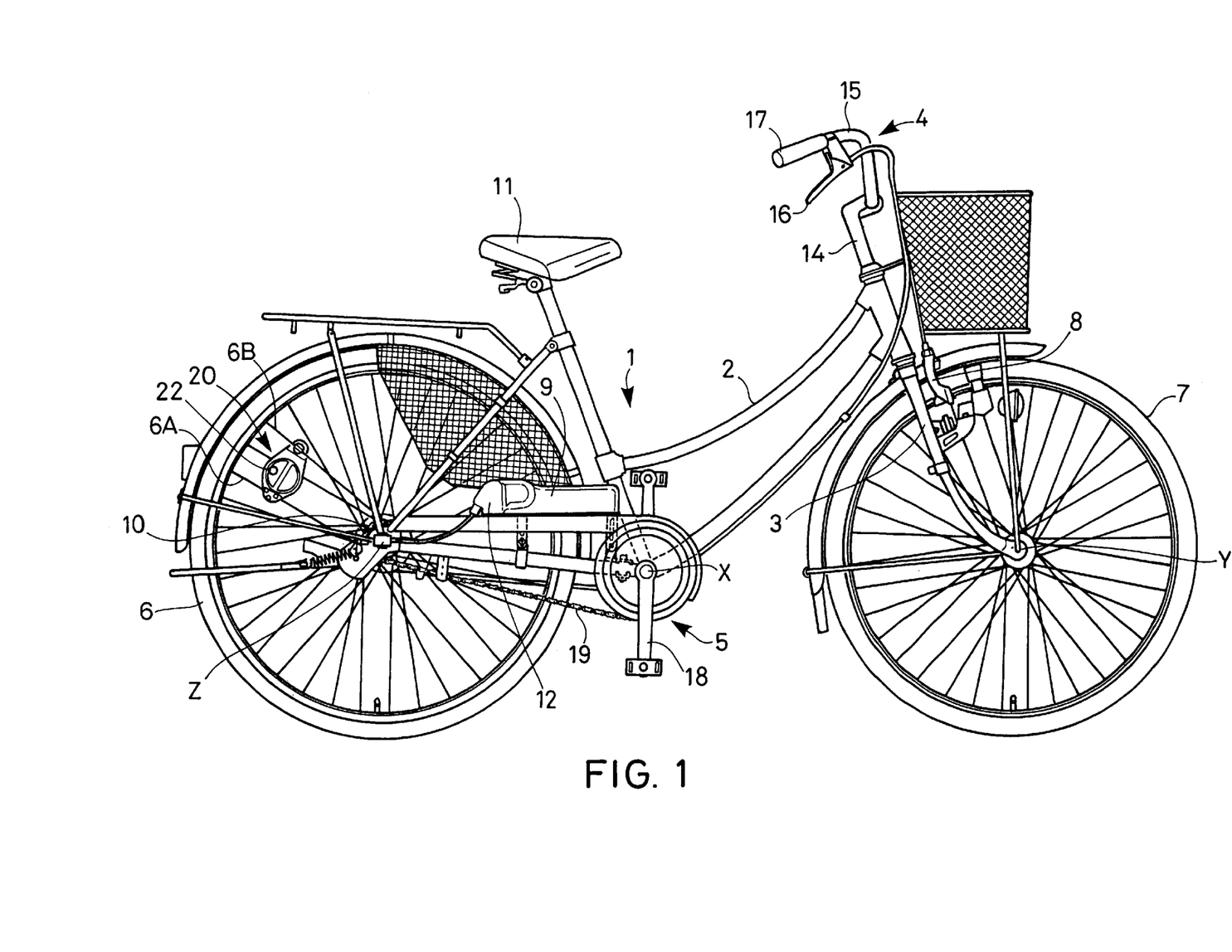
FIG. 1 is a side view of a bicycle that incorporates a particular embodiment of an apparatus according to the present invention for mounting a signal element to the bicycle wheel.

FIG. 1 is a side view of a bicycle that includes a particular embodiment of an apparatus 20 according to the present invention for mounting a signal element such as a magnet 22 to a bicycle wheel. The bicycle includes a frame 1 with a double-loop type of frame body 2 and a front fork 3; a handle component 4; a drive component 5 for rotation around an axis X; a front wheel 7 for rotation around an axis Y; a rear wheel 6 in which a three-speed internal shifting hub 10 is mounted for rotation around an axis Z; front and rear brake devices 8 (only the front brake device is shown in figure); a shift control element 9 for conveniently operating the internal shifting hub 10; and a saddle 11. The handle component 4 has a handle stem 14 that is fixed to the upper portion of the front fork 3 and a handlebar 15 that is fixed to the handle stem 14. Brake levers 16 and grips 17 which constitute part of the brake devices 8 are mounted at either end of the handlebar 15. The drive component 5 has a pedal crank 18 that is provided to the lower portion (bottom bracket portion) of the frame body 2, a chain 19 that is wrapped around the pedal crank 18, and the internal gear hub 10.

Shift control element 9 may be a computer controlled shift control element constructed according to the teachings of U.S. patent application Ser. No. 09/471,668, filed Dec. 24, 1999 and entitled Method and Apparatus for Selecting a Processing Mode for a Bicycle Computer. Shift control element 9 includes a sensor unit 12 that outputs signals by detecting magnet 22 mounted on apparatus 20 which, in turn, is mounted to spokes 6A and 6B of the rear wheel 6.

Figure 2:
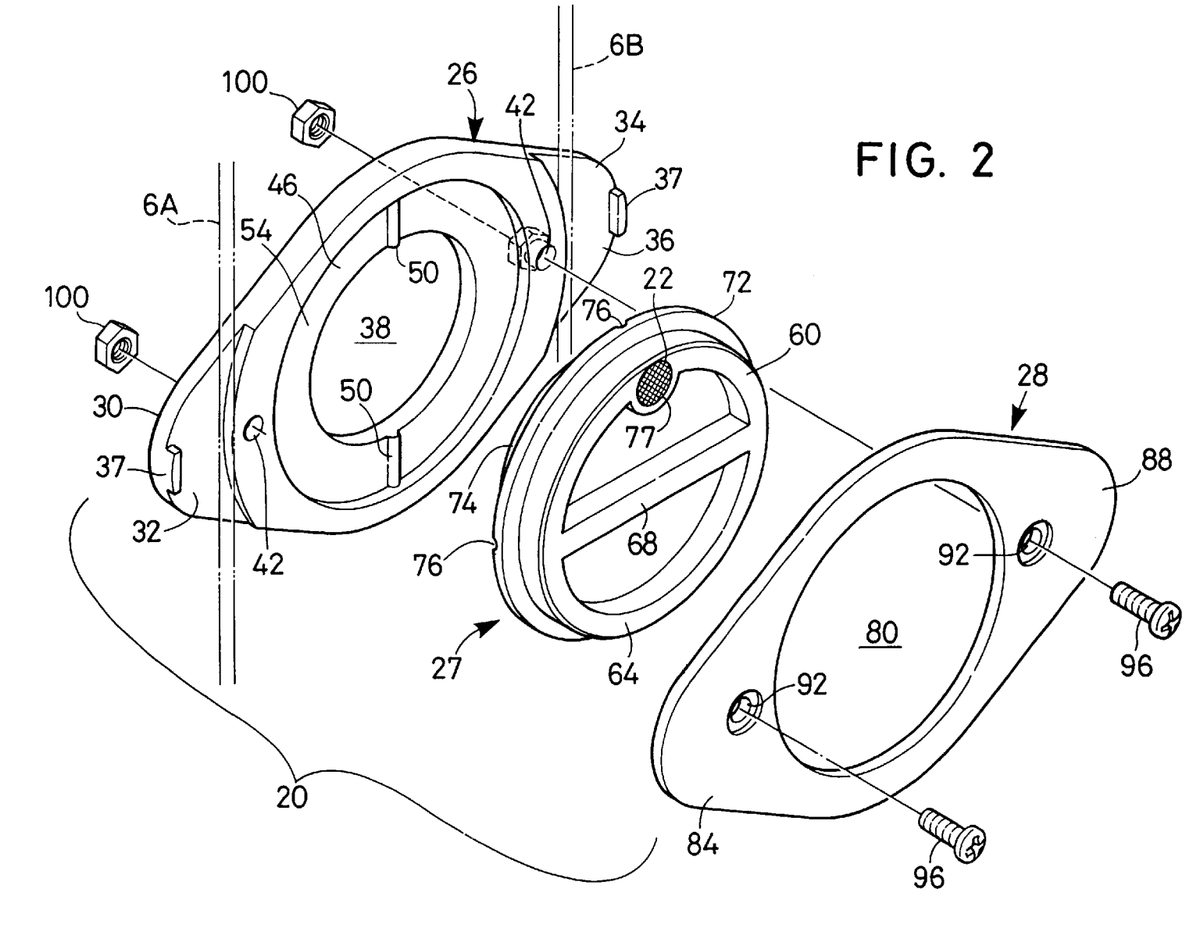
FIG. 2 is an exploded view of a first embodiment of an apparatus according to the present invention for mounting the signal element to the bicycle wheel.
Figure 3:
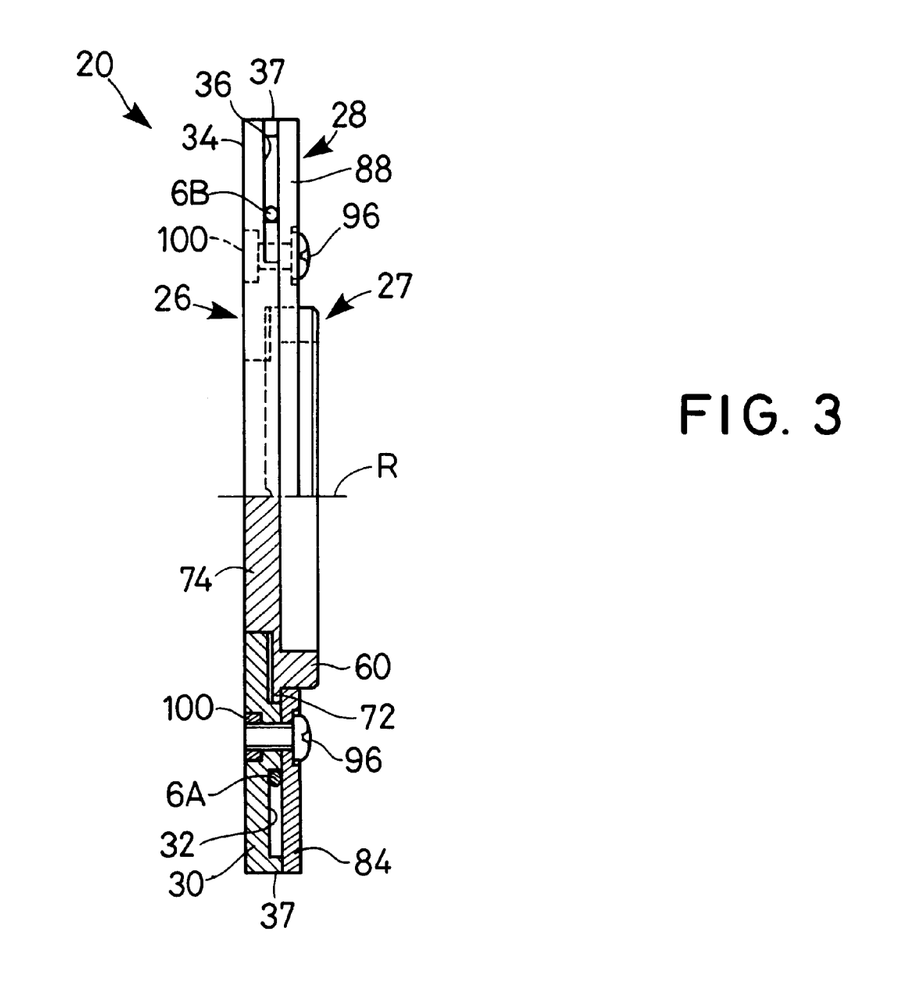
FIG. 3 is a top view of the apparatus in an assembled state.

FIG. 2 is an exploded view of apparatus 20, and FIG. 3 is a top view of apparatus 20 in an assembled condition. Apparatus 20 includes a base member 26, a movable member 27, and a retainer 28. Base member 26 includes a first spoke mounting portion 30 with a spoke mounting groove or recess 32 for mounting to spoke 6A, a second spoke mounting portion 34 with a spoke mounting groove or recess 36 for mounting to spoke 6B, side stops 37 for limiting rotation and translation of base member 26 relative to spokes 6A and 6B, a circular central opening 38, base member mounting openings 42, and a circular movable member mounting recess 46 concentric with central mounting opening 38. Diametrically opposed and radially extending elongated positioning projections 50 are formed on a surface 54 of mounting recess 46.

Figure 4:
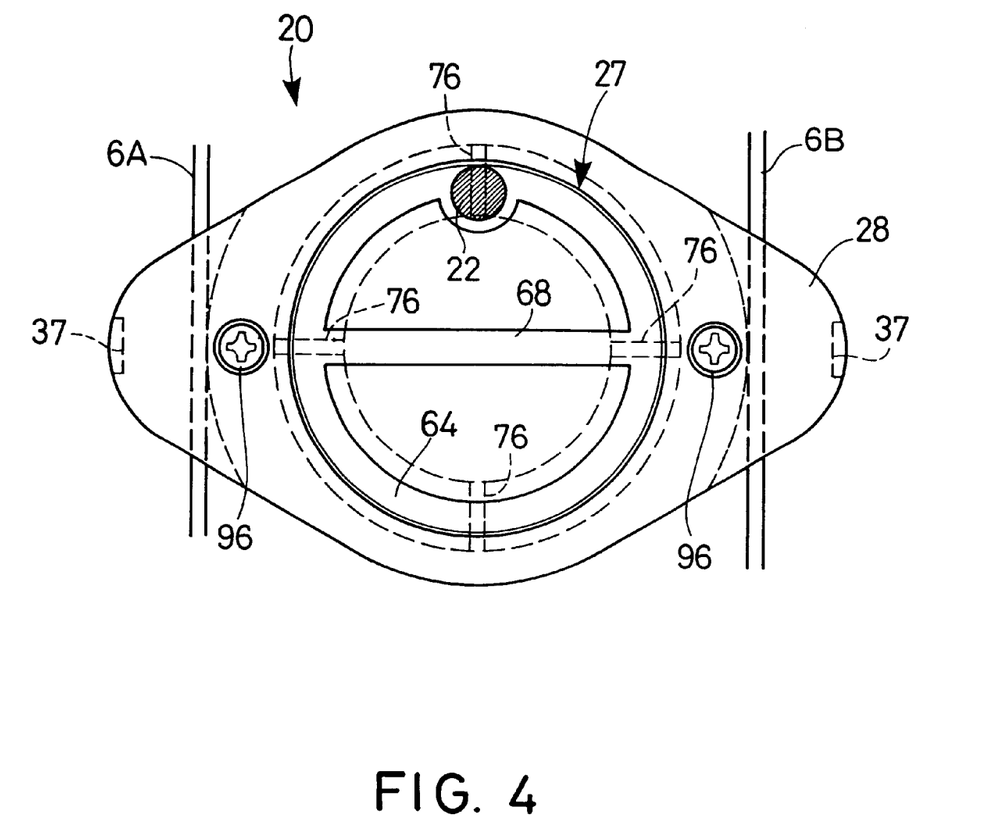
FIG. 4 is a front view of the apparatus showing the signal element in a first position.

Movable member 27 includes a circular magnet mounting member 60 having a circular annular magnet mounting rim 64, a grasping projection 68 extending across the diameter of magnet mounting rim 64, a circular mounting flange 72 extending radially outwardly from magnet mounting rim 64, and a circular guide projection 74 extending from the rear of magnet mounting member 60. In this embodiment, mounting flange 72 includes four diametrically opposed and radially extending positioning grooves 76 (only two such grooves are shown in FIG. 2), wherein the positioning grooves 76 are located 90° from each other as shown in FIG. 4. Magnet 22 is fitted within a magnet mounting recess 77 formed in magnet mounting rim 64 so that magnet 22 is radially offset from the rotational axis R (FIG. 3) of movable member 27.

Retainer 28 is a plate-shaped member that includes a circular central opening 80 sized to fit around magnet mounting rim 64, diametrically opposed base member mounting portions 84 and 88, and retainer mounting openings 92.

Apparatus 20 is assembled by placing base member 26 against spokes 6A and 6B so that spokes 6A and 6B are located within spoke mounting recesses 32 and 36, respectively. Then, guide projection 74 of movable member 27 is placed in mounting opening 38 of base member 26 such that one pair of positioning grooves on mounting flange 72 engage positioning projections 50 on base member 26.

Thereafter, retainer 28 is placed over movable member 27 so that magnet mounting rim 64 is fitted within opening 80, movable member 27 is sandwiched between base member 26 and retainer 28, and retainer mounting openings 92 align with base member mounting openings 42. Finally, mounting screws 96 are placed through retainer mounting openings 92 and base member mounting openings 42, and retainer 28 is fastened to base member 26 by tightening nuts 100 on screws 96.

Figure 5:
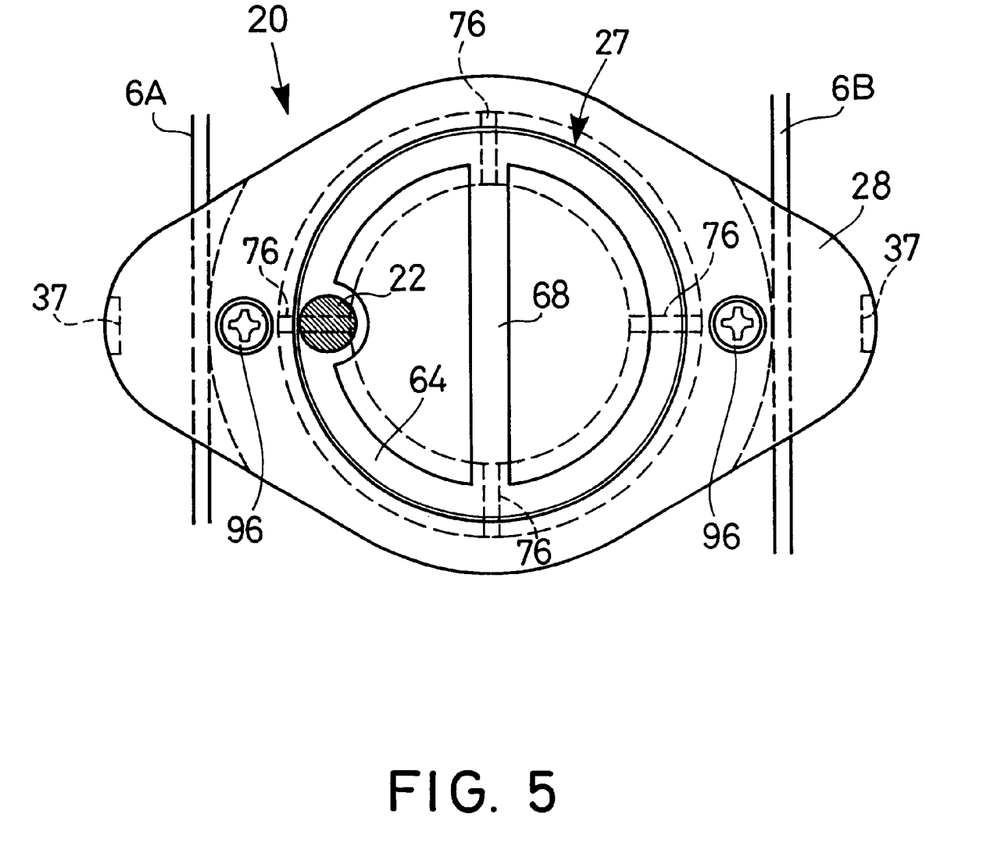
FIG. 5 is a front view of the apparatus showing the signal element in a second position.

FIG. 4 is a front view of apparatus 20 showing magnet 22 in a first position, which corresponds to the exploded view shown in FIG. 2. During initial assembly, if magnet 22 is not placed in the proper position, then base member can be translated or rotated relative to spokes 6A and 6B by loosening screws 96 and nuts 100 to set magnet 22 in the proper initial position. Thereafter, to change the position of magnet 22 to select a different processing mode for shift control device 9, screws 96 are loosened until retainer 28 separates from base member 26 enough that positioning grooves 76 can be disengaged from positioning projections 50. Thereafter, movable member 27 can be rotated 90° with the help of grasping projection 68 until the other pair of positioning grooves 76 engage positioning projections 50, and retainer 28 is again fastened to base member 26 by tightening screws 96 and nuts 100. Of course, if retainer 28 is made from a sufficiently resilient material, then movable member 27 may be rotated relative to base member 26 without loosening screws 96 and nuts 100, in which case positioning grooves 76 and positioning projections 50 functions as simple detents. In any case, the new position is then as shown in FIG. 5. As a result, the radial position of magnet 22 relative to the rotational axis Z of rear wheel 6 can be changed in a simple and reliable way.

Figure 6:
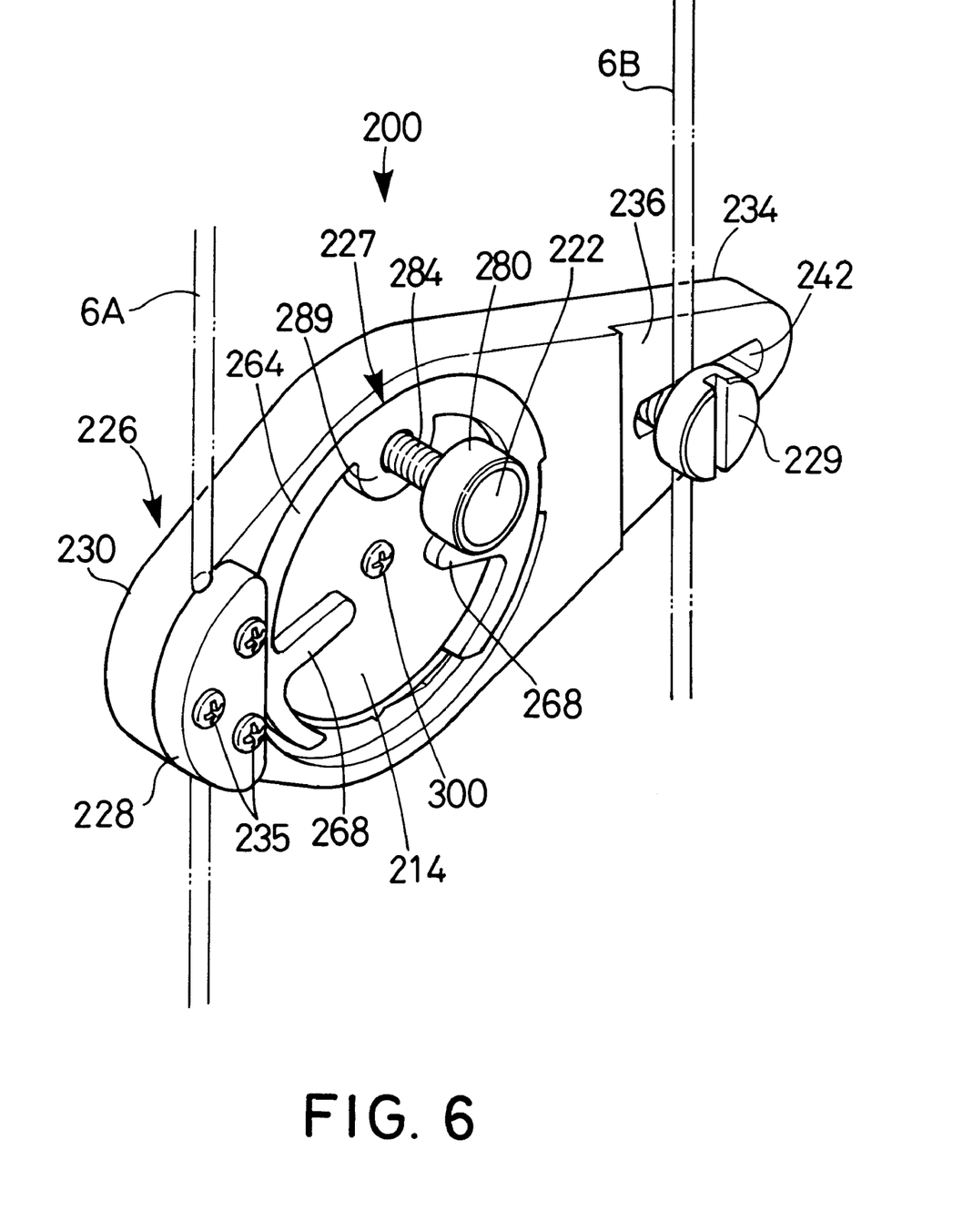
FIG. 6 is an oblique view of a second embodiment of an apparatus according to the present invention for mounting the signal element to the bicycle wheel.
Figure 7:
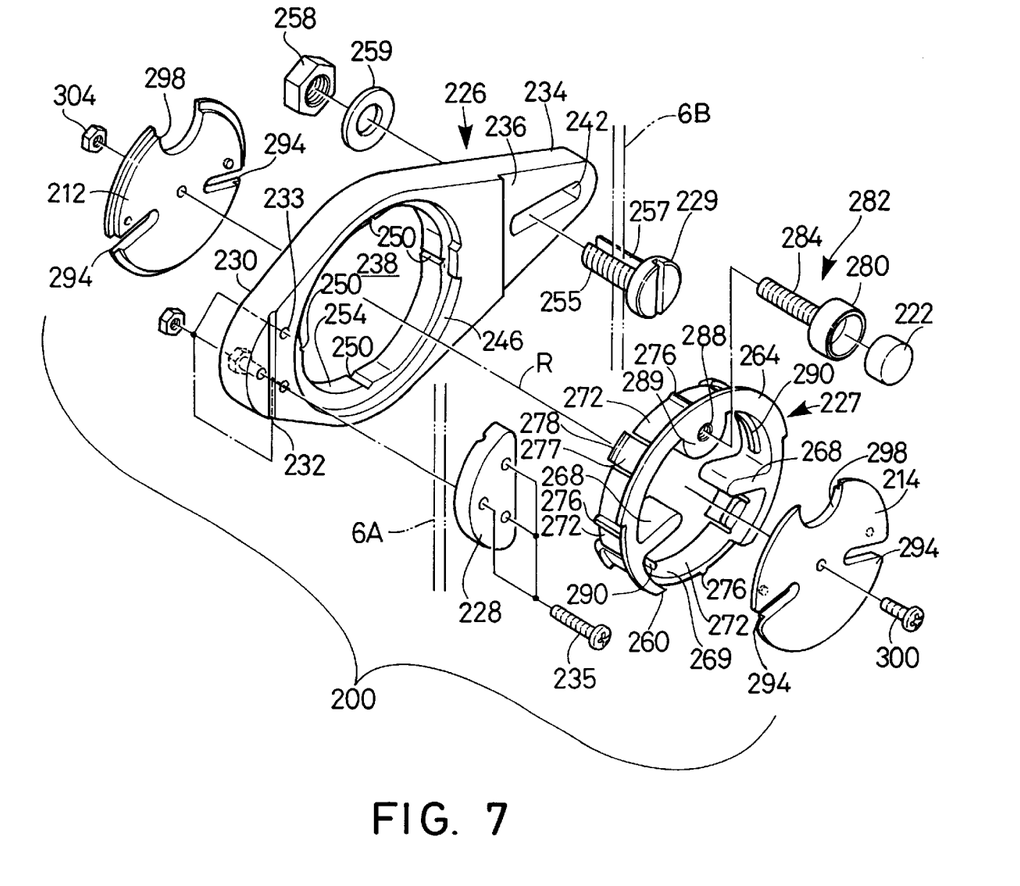
FIG. 7 is an exploded view of the apparatus shown in FIG. 6.

FIG. 6 is an oblique view of an apparatus 200 representing a second embodiment of the present invention for mounting a signal element such as a magnet 222 to the bicycle wheel, and FIG. 7 is an exploded view of apparatus 200. In this embodiment, apparatus 200 includes a base member 226, a movable member 227, a retaining plate 228, a retaining bolt 229, and light reflectors 212 and 214. Base member 226 includes a first spoke mounting portion 230 with a thin spoke mounting groove 232 that has the same general shape as spoke 6A and three threaded mounting holes 233 for engaging screws 235 used to fasten retaining plate 228, a second spoke mounting portion 234 with a spoke mounting groove or recess 236 and elongated slot 242 for mounting to spoke 6B, a circular central mounting opening 238, and a circular movable member mounting recess 246 concentric with mounting opening 238. Four diametrically opposed and axially extending elongated positioning grooves 250 are formed on the inner peripheral surface 254 of mounting opening 238.

Retaining bolt 229 has a threaded shank 255 with a slot 257 that allows shank 255 to straddle spoke 6B. Thus, second spoke mounting portion 234 may be mounted to spoke 6B by positioning spoke 6B within slot 257, extending shank 255 through slot 242 and placing a nut 258 and washer 259 on shank 255 at the rear of second spoke mounting portion 234. Slot 242 extends at least partially in a direction perpendicular to spoke mounting groove 232. This configuration allows base member 226 to be adjusted radially relative to rotational axis Z of rear wheel 6, since the circumferential distance between the spokes increases as base member 226 moves radially outwardly.

In this embodiment, movable member 227 includes a circular annular magnet mounting member 260 having a circular annular mounting flange 264, grasping projections 268 extending radially inwardly from an inner peripheral surface 269, four diametrically opposed mounting projections 272 extending from the rear of magnet mounting member 260, and four diametrically opposed locking tabs 277. In this embodiment, the four mounting projections 272 include four diametrically opposed and axially extending positioning projections 276 for engaging positioning grooves 250. Also, each locking tab 277 has a radially outwardly extending portions 278 for engaging the rear of base member 226 to thereby retain movable member 227 to base member 226.

Magnet 222 is fitted within a head 280 of a magnet mounting bolt 282 having a threaded shank 284 that screws into a threaded opening 288 of a magnet mounting boss 289 that protrudes radially inwardly from the inner peripheral surface 269 of movable member 227 so that magnet 222 is radially offset from the rotational axis R (FIG. 7) of movable member 227. This structure allows the axial position of magnet 222 to be easily adjusted merely by turning magnet mounting bolt 282.

Light reflectors 212 and 214 are provided to serve as safety reflectors when the bicycle is ridden at night. Each reflector 212 and 214 has a diameter that allows the reflectors to be fitted within movable member 227 and rest against abutments 290 formed on the inner peripheral surface 269 of movable member 227. Each reflector 212 and 214 has elongated slots 294 for receiving grasping projections 268 therethrough and a semicircular concavity 298 for receiving magnet mounting boss 289 therethrough. Reflectors 212 and 214 are fixed together by a screw 300 and nut 304.

To assemble apparatus 200, movable member 227 is mounted in base member 226 by slightly pressing locking tabs 277 radially inwardly and pressing movable member 227 through mounting opening 238 until locking tabs 277 and mounting projections 272 extend through mounting opening 238, radially outwardly extending portions 278 of locking tabs 277 engage the rear of base member 226, and mounting flange 264 is seated within recess 246. Reflectors 212 and 214 then are inserted into movable member 227 until they rest against abutments 290 and are fastened using screw 300 and nut 304. Thereafter, base member 226 is placed against spokes 6A and 6B so that spoke 6A is seated in spoke mounting groove 232. Retaining plate 228 is fastened to first spoke mounting portion 230 with screws 235, spoke 6B is inserted into slot 257 in bolt 229 so that bolt 229 extends through second spoke mounting portion 234, and second spoke mounting portion 234 is fastened to spoke 6B by nut 258 and washer 259.

Because of the resiliency of mounting projections 272 and locking tabs 277 in the radial direction, movable member 227 may be rotated using grasping projections 268 until a pair of the positioning projections 276 on movable member 227 engage the positioning grooves 250 in base member 226 to set magnet 222 in the desired position. The rotational position of magnet 222 relative to base member 226 can be changed simply by rotating movable member 227 so that another pair of positioning projections 276 engages positioning grooves 250 without disassembling apparatus 200.

Figure 8:
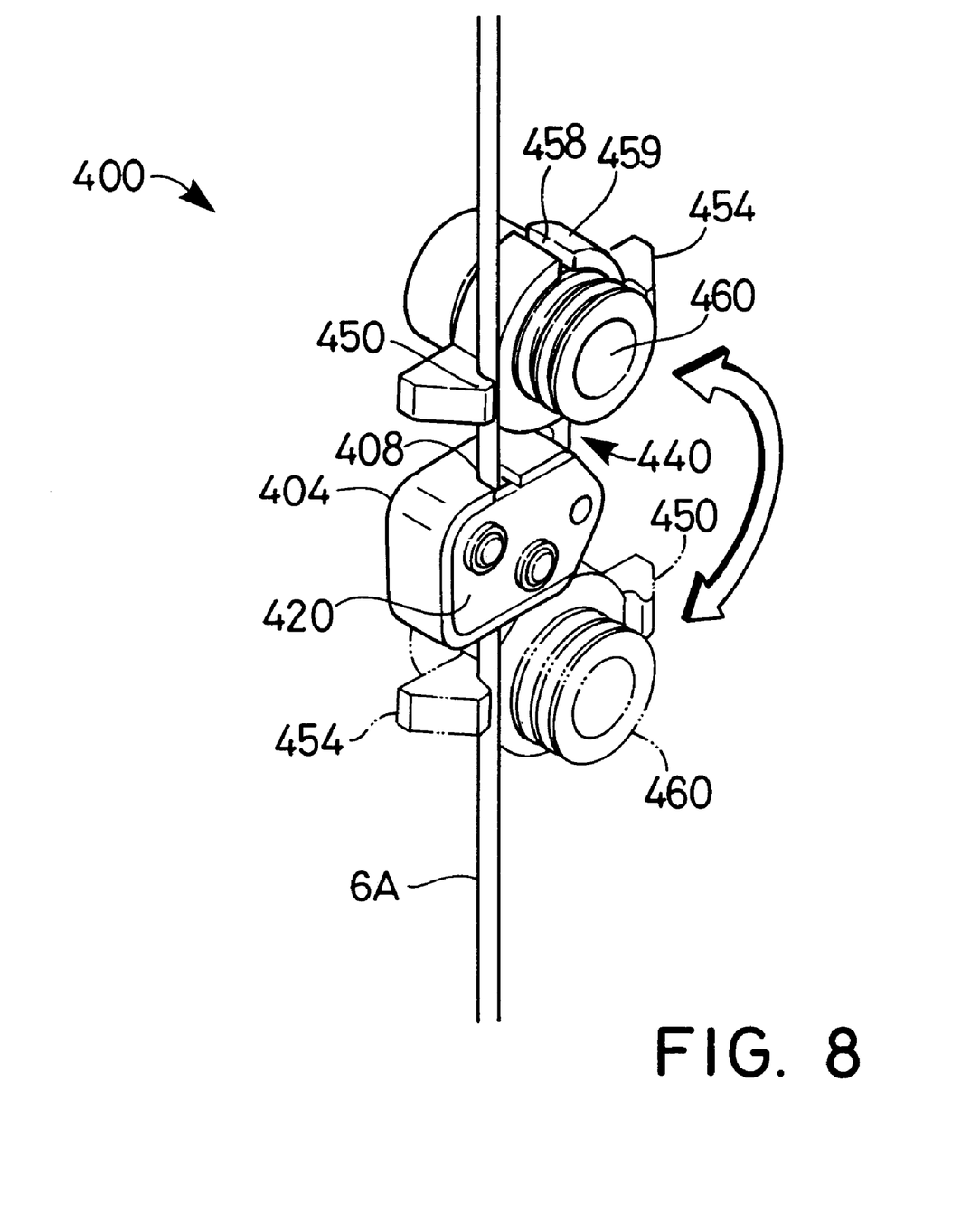
FIG. 8 is an oblique view of a third embodiment of an apparatus according to the present invention for mounting the signal element to the bicycle wheel.
Figure 9:
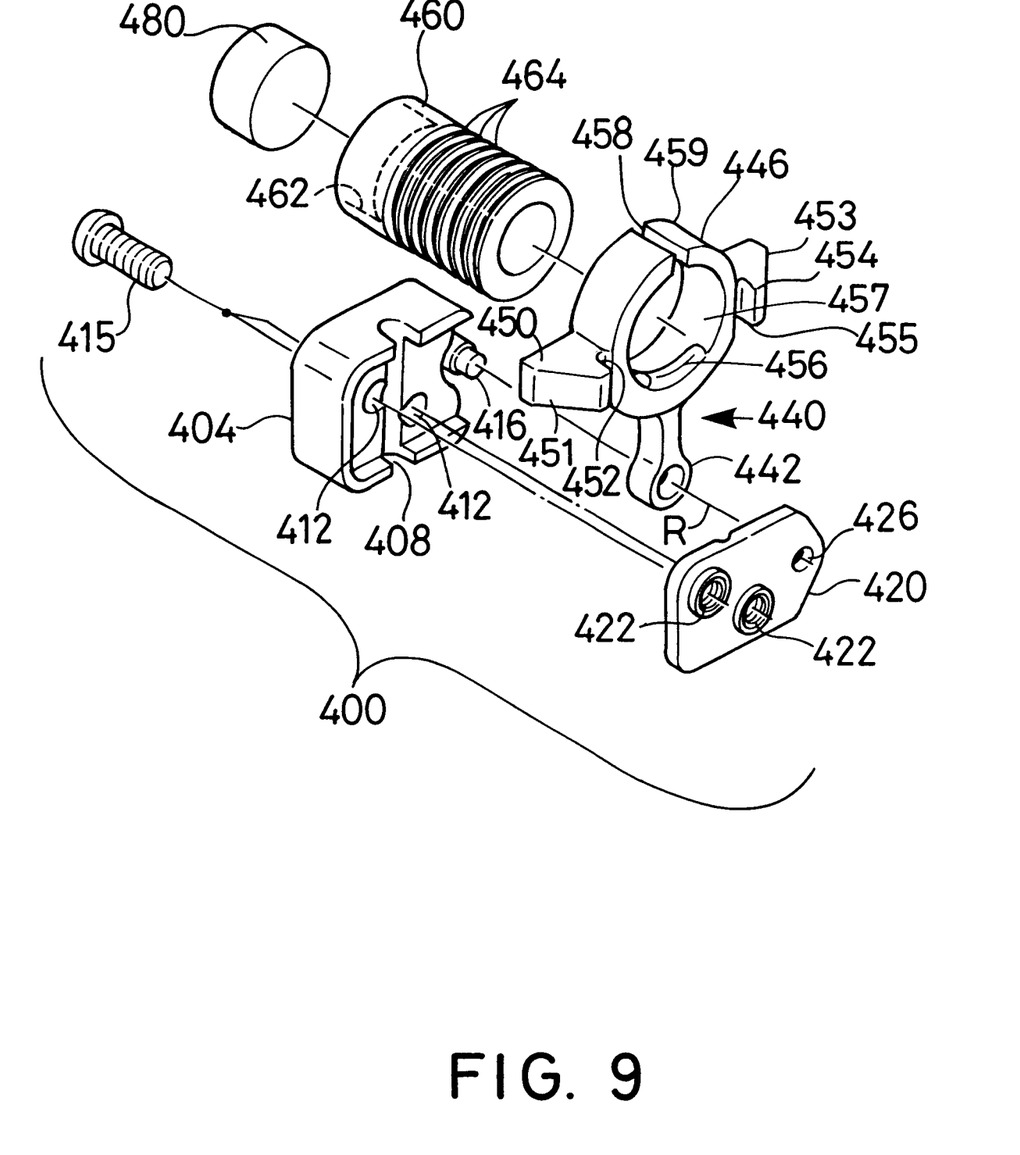
FIG. 9 is an exploded view of the apparatus shown in FIG. 8.

FIG. 8 is an oblique view of an apparatus 400 representing a third embodiment of the present invention for mounting a signal element to the bicycle wheel, and FIG. 9 is an exploded view of apparatus 400. Apparatus 400 includes a base member 404, a retaining plate 420, a movable member in the form of a magnet mounting arm 440, a magnet holder 460 and a magnet 480. Base member 404 includes a spoke mounting groove 408 for engaging spoke 6A, two openings 412 on opposite sides of spoke mounting groove 408 for receiving mounting screws 415 therethrough, and a pivot shaft 416 for pivotably mounting magnet mounting arm 440. Retaining plate 420 includes threaded openings 422 for engaging mounting screws 415, and a pivot shaft opening 426 for receiving pivot shaft 416 therein.

Magnet mounting arm 440 has an annular base member mounting boss 442 on a first end thereof for pivotably mounting magnet mounting arm 440 to pivot shaft 416, and a magnet mounting boss 446 on a second end thereof for supporting magnet holder 460 so that magnet 480 is radially offset from the rotational axis R (FIG. 9) of magnet mounting arm 440. A first latch 450 with a first cam surface 451 and a first latching surface 452 extends from a first side of magnet mounting boss 446 for latching magnet mounting arm 440 to spoke 6A in the position shown by solid lines in FIG. 8. Similarly, a second latch 453 having a second cam surface 454 and a second latching surface 455 extends from an opposite second side of magnet mounting boss 446 for latching magnet mounting arm 440 to spoke 6A in the position shown by broken lines in FIG. 8. A magnet positioning projection 456 extends radially inwardly from an inner peripheral surface 457 of magnet mounting boss 446, and a slot 458 extends completely through a side wall 459 of magnet mounting boss 446 to provide radial resiliency to magnet mounting boss for reasons discussed below.

Magnet holder 460 is a generally cylindrically-shaped member having a magnet mounting cavity 462 for mounting magnet 480 and a plurality of magnet positioning grooves 464 formed circumferentially around the outer peripheral surface thereof. One of the plurality of magnet positioning grooves 464 engages magnet positioning projection 456 to set the axial position of magnet holder 460 and thereby set the axial position of magnet 480.

Apparatus 400 is assembled by placing base member 404 against spoke 6A so that spoke 6A is engaged in spoke mounting groove 408. At the same time, base member mounting boss 442 of magnet mounting arm 440 is placed around pivot shaft 416. Thereafter, retaining plate 420 is fastened to base member 404 by aligning threaded openings 422 with openings 412, inserting pivot shaft 416 into pivot shaft opening 426, extending mounting screws 415 through openings 412, and screwing mounting screws 415 into threaded openings 422. In this manner, base member 404 is attached to spoke 6A, and magnet mounting arm 440 is pivotably retained to base member 404 through pivot shaft 416. Magnet holder 460, with magnet 480 secured therein, is inserted into magnet mounting boss 446 until a desired positioning groove 464 engages positioning projection 456 to set the desired axial position of magnet 480. The insertion of magnet holder 460 into magnet mounting boss 446 is facilitated by slot 458 which provides radial resiliency to magnet mounting boss 446.

Finally, magnet mounting arm 440 is rotated around pivot shaft 416 and latched in either the position shown by solid lines in FIG. 8 or the position shown by broken lines in FIG. 8. Latch 450 is sufficiently resilient that magnet mounting boss 446 may be latched to spoke 6A in the position shown by solid lines in FIG. 8 simply by rotating magnet mounting arm 440 until first cam surface 451 presses against spoke 6A. Further rotation of magnet mounting arm 440 causes latch 450 to bend away from spoke 6A until spoke 6A rides over the crest of first cam surface 451 and engages first latching surface 452.

To change the position of magnet mounting arm 440, the user presses against first cam surface 451 to bend first latch 450 backward and disengage spoke 6A from first latching surface 452. Then magnet mounting arm 440 is rotated 180° until second cam surface 454 of second latch 453 presses against spoke 6A. Further rotation of magnet mounting arm 440 causes second latch 453 to bend away from spoke 6A until spoke 6A rides over the crest of second cam surface 454 and engages second latching surface 455. Second latch 453 is disengaged from spoke 6A by similarly pressing against second cam surface 454 to bend second latch 453 backward.

Figure 10:
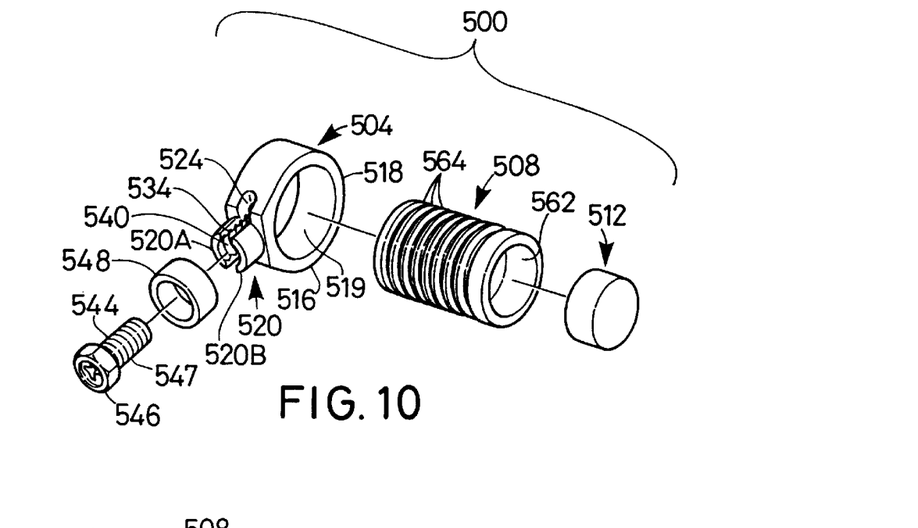
FIG. 10 is an exploded view of a fourth embodiment of an apparatus according to the present invention for mounting the signal element to the bicycle wheel.
Figure 11:
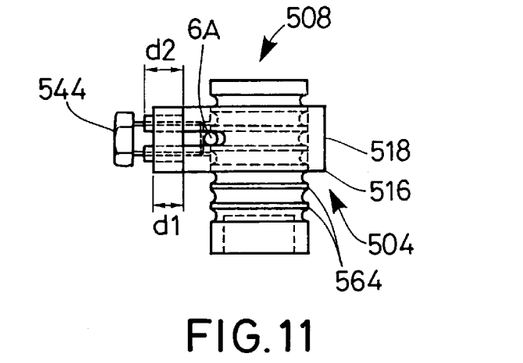
FIG. 11 is a top cut away view of the apparatus shown in FIG. 10.
Figure 12:
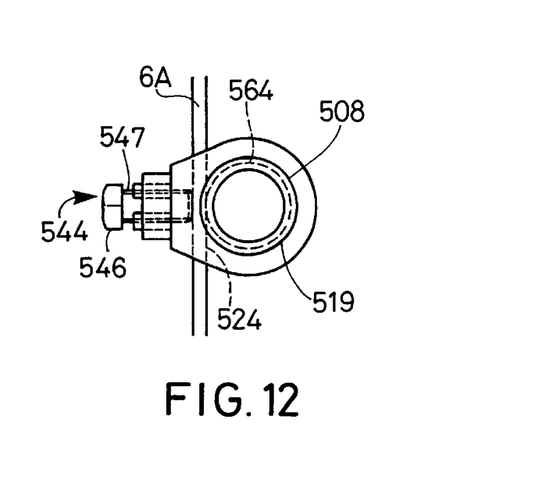
FIG. 12 is a front cross sectional view of the apparatus shown in FIG. 10.

FIG. 10 is an exploded view of an apparatus 500 representing a fourth embodiment of the present invention for mounting the signal element to thee bicycle wheel, FIG. 11 is a top cut away view of apparatus 500, and FIG. 12 is a front cross sectional view of apparatus 500. Apparatus 500 includes a base member 504, a movable member in the form of a magnet holder 508, and a magnet 512. Base member 504 includes a tubular movable member mounting boss 516 having a side wall 518 defining a central opening 519, wherein a spoke mounting protuberance 520 extends from side wall 518 and defines a spoke mounting protuberance axis X. In this embodiment, a side wall opening in the form of a side wall slot 524 extends through side wall 518 in a circumferential direction so that, when base member 504 is mounted to spoke 6A as shown in FIG. 12, spoke 6A extends slightly into central opening 519 for reasons discussed below.

Spoke mounting protuberance 520 includes a protuberance slot 534 extending completely through spoke mounting protuberance 520 for receiving spoke 6A therein. Protuberance slot 534 thus splits spoke mounting protuberance 520 into two protuberance sections 520A and 520B, and protuberance slot 534 communicates with and is oriented in the same direction as side wall slot 524. In this embodiment, side wall slot 524 is sufficiently deep that spoke 6A is fitted entirely within side wall slot 524, and no part of spoke 6A extends into protuberance slot 534 so that spoke 6A does not tend to spread protuberance sections 520A and 520B apart. Of course, in other embodiments spoke 6A may be allowed to extend into protuberance slot 534.

In this embodiment, spoke mounting protuberance 520 includes a threaded inner peripheral surface 540 for threadingly engaging a fastener in the form of a mounting screw 544 having a head 546 and a threaded shank 547. Head 546 of mounting screw 544 may have a multi-sided (e.g., hexagonal) outer peripheral surface and/or a multi-sided (e.g., hexagonal) inner peripheral surface for engaging a tool. A support ring 548 is provided for surrounding spoke mounting protrusion 520 to prevent unwanted spreading of protuberance sections 520A and 520B when mounting screw 544 is screwed into spoke mounting protuberance 520. As shown in FIG. 11, a length d1 of support ring 548 preferably is less than a length d2 of spoke mounting protuberance 520, although in other embodiments this relationship could change. Also, shank 547 of mounting screw 544 has a sufficient length that head 544 does not contact either spoke mounting protuberance 520 or support ring 548 to ensure that the free end of mounting screw 544 will reliably press against spoke 6A as shown in FIGS. 11 and 12.

As in the third embodiment, magnet holder 508 is a generally cylindrically-shaped member having a magnet mounting cavity 562 for mounting magnet 512 and a plurality of magnet positioning grooves 564 formed circumferentially (either parallel or in a spiral manner) around the outer peripheral surface thereof. Magnet holder 508 is adapted to be fitted within central opening 519 of movable member mounting boss 516, and one of the plurality of magnet positioning grooves 564 engages the portion of spoke 6A extending into central opening 519 as shown in FIG. 12 to set the axial position of magnet holder 508 and thereby set the axial position of magnet 512.

Figure 13:
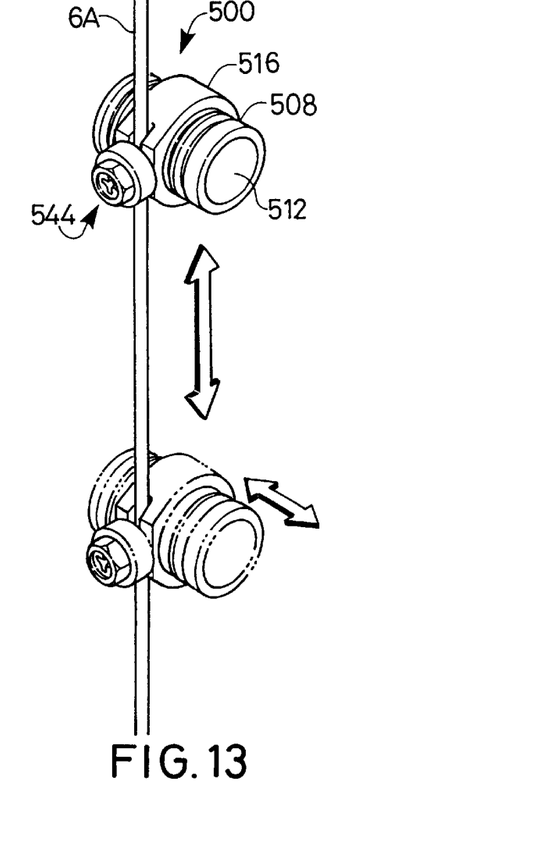
FIG. 13 is an oblique view of the apparatus shown in FIG. 10 mounted to a spoke.

Apparatus 500 is assembled by placing base member 504 against spoke 6A so that spoke 6A is seated within side wall slot 524 and magnet holder 508 is in the desired position relative to movable member mounting boss 516. Thereafter, support ring 548 is placed over spoke mounting protuberance 520, and mounting screw 544 is screwed into spoke mounting protuberance 520 until the free end of shank 547 presses against spoke 6A. During this precess, apparatus 500 may be moved along spoke 6A as shown in FIG. 13, and the position of magnet holder 508 relative to movable member mounting boss 516 may be adjusted as desired.

Figure 14:
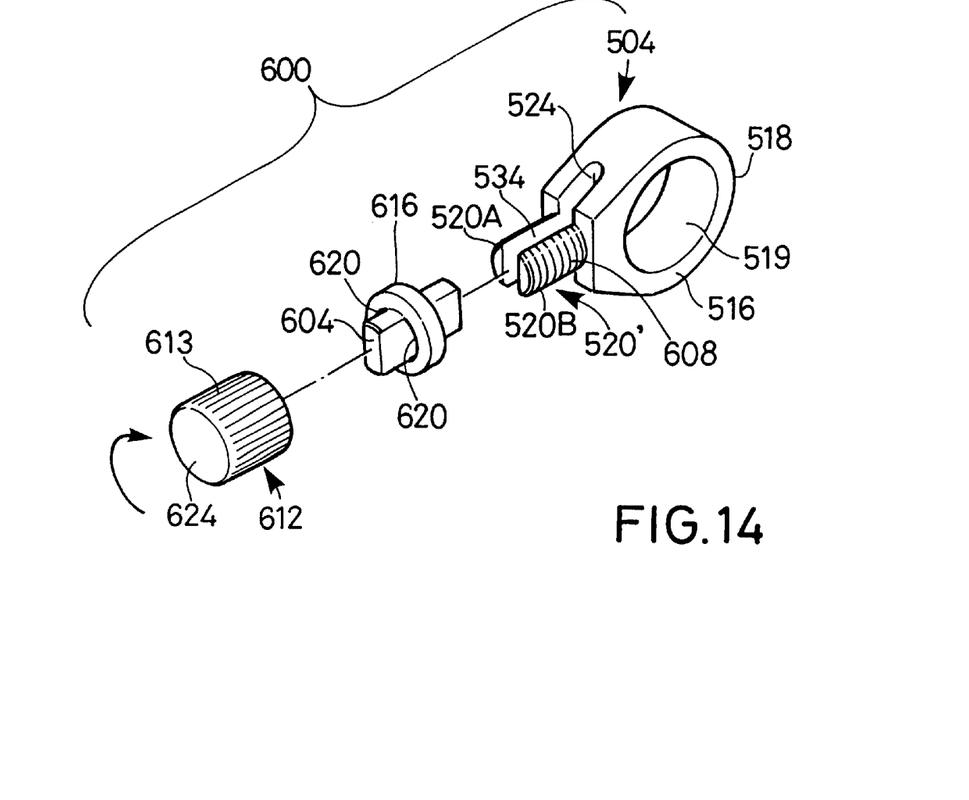
FIG. 14 is an exploded view of a fifth embodiment of an apparatus according to the present invention for mounting the signal element to the bicycle wheel.
Figure 15:
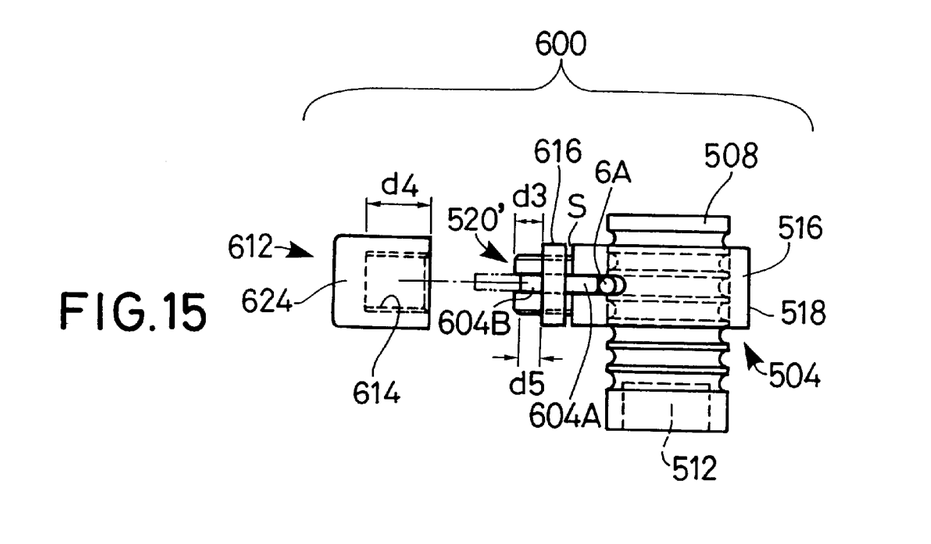
FIG. 15 is a top cut away view of the apparatus shown in FIG. 10.

FIG. 14 is an exploded view of an apparatus 600 representing a fifth embodiment of the present invention for mounting the signal element to the bicycle wheel, and FIG. 15 is a top cut away view of apparatus 600. This embodiment is similar to the fourth embodiment shown in FIGS. 10–15, so the identical components are numbered the same.

In this embodiment, a plate-shaped spoke pressing member 604 is adapted to be fitted within protuberance slot 534, a spoke mounting protuberance 520' includes a threaded outer peripheral surface 608, and a nut 612 with a knurled outer peripheral surface 613 and a threaded inner peripheral surface 614 is provided for causing spoke pressing member 604 to be moved toward side wall slot 524 for pressing against spoke 6A. A support ring 616 surrounds spoke pressing member 604 and is coupled for movement with spoke pressing member 604. For example, support ring 616 may be bonded to spoke pressing member 604 or may be formed as one piece with spoke pressing member 604. As a result, support ring 616 forms two holes 620 for receiving protuberance sections 520A and 520B therethrough.

To ensure reliable engagement of spoke 6A, the length of a portion 604A of spoke pressing member 604 is set so that there will be a space S between support ring 616 and side wall 518 of movable member mounting boss 516. Also, a length d3 of an exposed portion of spoke mounting protuberance 520' is less than a length d4 of the threaded inner peripheral surface 614 of nut 612, and a length d5 of a portion 604B of spoke pressing member 604 is set so that portion 604B does not protrude from spoke mounting protuberance 520' to ensure that nut 612 will press against support ring 616. Alternatively, if nut 612 includes a side wall 624 as shown in FIGS. 14 and 15, then length d5 of portion 604B of spoke pressing member 604 can be set to protrude from spoke mounting protuberance 520' as shown by the broken lines in FIG. 15 so that side wall 624 presses against the end of portion 604B and thereby causes portion 604A of spoke pressing member 604 to press against spoke 6A.

Apparatus 600 is assembled by placing base member 504 against spoke 6A so that spoke 6A is seated within side wall slot 524 and magnet holder 508 is in the desired position relative to movable member mounting boss 516. Thereafter, spoke pressing member 604 is placed within protuberance slot 534 so that protuberance sections 520A and 520B extend through holes 620 and support ring 616 surrounds spoke mounting protuberance 520'. Nut 612 then is screwed onto spoke mounting protuberance 520' until either nut 612 presses against support ring 616 or side wall 624 of nut 612 presses against the free end of portion 604B, depending upon the embodiment, so that portion 604A of spoke pressing member 604 presses against spoke 6A. During this precess, apparatus 600 may be moved along spoke 6A in the same manner as in the fourth embodiment shown in FIG. 13, and the position of magnet holder 508 relative to movable member mounting boss 516 may be adjusted accordingly.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for mounting a signal element to a spoke of a bicycle wheel comprising:

a base member adapted to be mounted to the spoke of the wheel for rotation therewith;

a movable member coupled to the base member so that the movable member can be located in different positions that are at least partially in a direction perpendicular to the spoke when the base member is immovably secured to the spoke at the same location on the spoke; and a signal element mounted to the movable member for movement therewith at least partially in a direction perpendicular to the spoke.

2. The apparatus according to claim 1 wherein the base member includes a first spoke mounting portion for mounting to a first spoke.

3. The apparatus according to claim 2 wherein the first spoke mounting portion includes a spoke mounting groove for receiving the first spoke therein.

4. The apparatus according to claim 2 wherein the first spoke mounting portion includes an elongated slot.

5. The apparatus according to claim 1 wherein the movable member is coupled for rotation relative to the base member.

6. The apparatus according to claim 5 wherein one of the base member and the movable member includes a positioning groove, and wherein the other one of the base member and the movable member includes a positioning projection for engaging the positioning groove for setting the movable member in a predetermined position relative to the base member.

7. The apparatus according to claim 1 wherein the movable member includes a grasping projection.

8. The apparatus according to claim 1 further comprising a retainer for coupling the movable member to the base member.

9. The apparatus according to claim 1 further comprising a positioning mechanism for positioning the movable member relative to the base member.

10. The apparatus according to claim 9 wherein the positioning mechanism sets the movable member in one of a predetermined plurality of positions relative to the base member.

11. The apparatus according to claim 10 wherein the positioning mechanism comprises:

a positioning groove disposed on one of the base member and the movable member; and a positioning projection disposed on the other one of the base member and the movable member.

12. The apparatus according to claim 1 wherein the moving member comprises a mounting arm.

13. The apparatus according to claim 12 wherein the mounting arm pivots relative to the base member.

14. The apparatus according to claim 13 wherein the mounting arm includes a first latch for latching the mounting arm in a first position relative to the base member.

15. The apparatus according to claim 14 wherein the mounting arm includes a second latch for latching the mounting arm in a second position relative to the base member.

16. The apparatus according to claim 13 wherein the mounting arm is coupled to the base member through a pivot shaft.

17. The apparatus according to claim 16 wherein the signal element mounting location is radially spaced apart from the pivot shaft.

18. The apparatus according to claim 17 further comprising a first latch extending from a first side of the mounting arm.

19. The apparatus according to claim 18 further comprising a second latch extending from an opposite second side of the mounting arm.

20. The apparatus according to claim 19 wherein the first latch and the second latch are disposed in close proximity to the signal element mounting location.

21. The apparatus according to claim 19 wherein the mounting arm pivots approximately 180° relative to the base member.

22. The apparatus according to claim 1 further comprising a signal element moving mechanism for moving the signal element relative to the movable member.

23. The apparatus according to claim 1 wherein the movable member can be located in the different positions without removing the base member from the movable member.

24. An apparatus for mounting a signal element to a bicycle wheel comprising:
   a base member adapted to be mounted to a spoke of the wheel for rotation therewith;
   a movable member coupled to the base member for movement relative to the base member;
   a signal element mounted to the movable member for movement therewith at least partially in a direction perpendicular to the spoke;
   wherein the base member includes a mounting opening, and wherein the movable member is rotatably mounted in the mounting opening.

25. The apparatus according to claim 24 wherein the mounting opening has a substantially circular shape.

26. An apparatus for mounting a signal element to a bicycle wheel comprising:
   a base member adapted to be mounted to a spoke of the wheel for rotation therewith;
   a movable member coupled to the base member for movement relative to the base member;
   a signal element mounted tot he movable member for movement therewith at least partially in a direction perpendicular to the spoke;
   wherein the base member includes a mounting opening, and wherein the movable member is disposed in the mounting opening.

27. The apparatus according to claim 26 wherein the movable member extends through the mounting opening.

28. The apparatus according to claim 27 wherein one of the base member and the movable member includes a positioning groove, and wherein the other one of the base member and the movable member includes a positioning projection for engaging the positioning groove for setting the movable member in a predetermined position relative to the base member.

29. The apparatus according to claim 27 wherein the movable member includes a grasping projection.

30. The apparatus according to claim 27 wherein the movable member includes a retaining member for retaining the movable member in the mounting opening.

31. An apparatus for mounting a signal element to a spoke of a bicycle wheel comprising:
   a base member adapted to be mounted to the spoke of the wheel for rotation therewith, wherein the base member comprises:
      a movable member mounting boss; and
      a spoke mounting protuberance coupled to the movable member mounting boss;
   a movable member coupled to the movable member mounting boss for movement relative to the base member when the base member is mounted to the spoke; and
   a signal element mounted to the movable member for movement therewith at least partially in a direction perpendicular to the spoke.

32. The apparatus according to claim 31 wherein the movable member mounting boss includes a tubular member having a side wall.

33. The apparatus according to claim 32 wherein the tubular member has a side wall opening extending through the side wall.

34. The apparatus according to claim 33 wherein the side wall opening is a side wall slot extending in a circumferential direction of the tubular member.

35. The apparatus according to claim 31 wherein the spoke mounting protuberance extends from a side wall of the movable member mounting boss.

36. The apparatus according to claim 35 wherein the spoke mounting protuberance includes a protuberance slot for receiving a spoke therein.

37. The apparatus according to claim 36 wherein the protuberance slot extends completely through the spoke mounting protuberance.

38. The apparatus according to claim 36 wherein the movable member mounting boss includes a tubular member defining the side wall.

39. The apparatus according to claim 38 wherein the tubular member has a side wall opening extending through the side wall and communicating with the protuberance slot.

40. The apparatus according to claim 39 wherein the side wall opening is a side wall slot extending in a circumferential direction of the tubular member.

41. The apparatus according to claim 40 wherein the side wall slot is oriented the same as the protuberance slot.

42. The apparatus according to claim 39 wherein the movable member is adapted to be fitted within the tubular member.

43. The apparatus according to claim 42 wherein the movable member includes a plurality of positioning grooves on an outer peripheral surface thereof.

44. The apparatus according to claim 39 wherein the spoke mounting protuberance includes a threaded inner peripheral surface.

45. The apparatus according to claim 44 further comprising a mounting screw engaging the threaded inner peripheral surface.

46. The apparatus according to claim 45 further comprising a support ring surrounding the spoke mounting protuberance.

47. The apparatus according to claim 39 further comprising a spoke pressing member adapted to be fitted within the protuberance slot.

48. The apparatus according to claim 47 wherein the spoke mounting protuberance includes a threaded outer peripheral surface, and further comprising a nut for causing the spoke pressing member to be moved toward the side wall opening.

49. The apparatus according to claim 48 wherein the nut has an end wall for pressing against an end of the spoke pressing member.

50. The apparatus according to claim 49 further comprising a support ring surrounding the spoke mounting protrusion.

51. The apparatus according to claim 48 further comprising a support ring coupled for movement with the spoke pressing member and surrounding the spoke mounting protuberance.

52. The apparatus according to claim 51 wherein the nut is structured for pressing against the support ring.

53. An apparatus for mounting a signal element to a spoke of a bicycle wheel comprising:
- a base member adapted to be mounted to the spoke of the wheel for rotation therewith;
- a movable member coupled to the base member for movement relative to the base member when the base member is mounted to the spoke;
- a signal element mounted to the movable member for movement therewith at least partially in a direction perpendicular to the spoke; and
- wherein the base member has a circumferentially extending wall and a circumferentially extending opening passing through a circumferential portion of the wall such that a force applying member may be disposed on a first side of the wall and the movable member may be disposed on an opposite second side of the wall, wherein the opening is disposed between the force applying member and the movable member, and wherein the force applying member applies a compressive force radially toward the circumferential portion of the wall so that a movable member engaging member disposed in the opening receives the compressive force from the force applying member and engages the movable member.

54. An apparatus for mounting a signal element to a spoke of a bicycle wheel comprising:
- a base member adapted to be mounted to the spoke of the wheel for rotation therewith;
- a movable member coupled to the base member for movement relative to the base member when the base member is mounted to the spoke;
- a signal element mounted to the movable member;
- wherein the base member has an opening through a wall such that the spoke may be disposed on a first side of the wall and the movable member may be disposed on a second side of the wall; and
- a force applying member disposed on the first side of the wall, wherein the force applying member applies a force toward the first side of the wall to press the spoke into the opening so that the spoke engages the movable member.

55. An apparatus for mounting a signal element to a spoke of a bicycle wheel comprising:
- a base member adapted to be mounted to the spoke of the wheel for rotation therewith, wherein the base member has a tubular portion with a circumferentially extending side wall;
- wherein the circumferentially extending side wall includes an elongated slot that extends in the circumferential direction and through the side wall;
- a movable member coupled to the base member for movement relative to the base member when the base member is mounted to the spoke; and
- a signal element mounted to the movable member for movement therewith at least partially in a direction perpendicular to the spoke.

56. An apparatus for mounting a signal element to a spoke of a bicycle wheel comprising:
- a base member adapted to be mounted to the spoke of the wheel for rotation therewith, wherein the base member has a tubular portion with a side wall that extends in a circumferential direction;
- wherein the side wall includes an elongated slot that extends in the circumferential direction for aligning with a spoke of the bicycle wheel;
- a movable member coupled to the base member for movement relative to the base member when the base member is mounted to the spoke;
- wherein the movable member includes a plurality of positioning grooves parallel to the slot so that the plurality of positioning grooves are parallel to the spoke when the base member is mounted to the spoke; and
- a signal element mounted to the movable member for movement therewith at least partially in a direction perpendicular to the spoke.

57. An apparatus for mounting a signal element to a spoke of a bicycle wheel comprising:
- a base member adapted to be mounted to the spoke of the wheel for rotation therewith, wherein the base member comprises:
  - a movable member mounting boss comprising a first side wall, a second side wall and a circumferentially extending intermediate wall disposed between the first side wall and the second side wall; and
  - a spoke mounting protuberance extending radially outwardly from the intermediate wall between the first side wall and the second side wall;
- a movable member coupled to the movable member mounting boss for movement relative to the base member when the base member is mounted to the spoke; and
- a signal element mounted to the movable member for movement therewith at least partially in a direction perpendicular to the spoke.

58. An apparatus for mounting a signal element to a spoke of a bicycle wheel comprising:
- a base member adapted to be mounted to the spoke of the wheel for rotation therewith, wherein the base member comprises:
  - a movable member mounting boss; and
  - a spoke mounting protuberance coupled to the movable member mounting boss and defining a spoke mounting protuberance axis;
- a movable member coupled to the movable member mounting boss for movement relative to the base member when the base member is mounted to the spoke;
- wherein the spoke mounting protuberance is oriented relative to the movable member mounting boss such that movable member can move at least in part in a direction perpendicular to the spoke without rotating around the spoke mounting protuberance axis; and
- a signal element mounted to the movable member for movement therewith at least partially in a direction perpendicular to the spoke.

59. The apparatus according to claim 58 further comprising a fastener that moves along the spoke mounting protuberance axis for fastening the base member to the spoke, wherein the fastener is separate from the base member and the movable member.

60. An apparatus for mounting a signal element to a spoke of a bicycle wheel comprising:
- a base member adapted to be mounted to the spoke of the wheel for rotation therewith, wherein the base member comprises:
  - a movable member mounting boss; and
  - a spoke mounting protuberance coupled to the movable member mounting boss and defining a spoke mounting protuberance axis;
- a movable member coupled to the movable member mounting boss for movement relative to the base member when the base member is mounted to the spoke, wherein the movable member mounting boss is structured to constrain movement of the movable member to a predetermined direction;
- wherein the spoke mounting protuberance is oriented relative to the movable member mounting boss such that movable member can move at least in part in a direction perpendicular to the spoke without rotating coaxially with the spoke mounting protuberance axis and without rotating around the spoke; and
- a signal element mounted to the movable member for movement therewith at least partially in a direction perpendicular to the spoke.

* * * * *